United States Patent [19]

Tate et al.

[11] Patent Number: 4,749,408
[45] Date of Patent: Jun. 7, 1988

[54] METHOD OF BOTTOM BLOWING OPERATION OF A STEEL MAKING ELECTRIC FURNACE

[75] Inventors: Masahisa Tate, Kanagawa; Makoto Watanabe, Tokyo; Tsutomu Kuroda, Kawaguchi, all of Japan

[73] Assignee: Toshin Steel Co., Ltd., Tokyo, Japan

[21] Appl. No.: 62,472

[22] Filed: Jun. 12, 1987

[30] Foreign Application Priority Data

Jun. 24, 1986 [JP] Japan .................. 61-146033
Jun. 24, 1986 [JP] Japan .................. 61-146034
Jul. 31, 1986 [JP] Japan .................. 61-178765
Jul. 31, 1986 [JP] Japan .................. 61-178766

[51] Int. Cl.⁴ .......................... C21C 5/52; C21C 7/10
[52] U.S. Cl. ............................................. 75/10.41
[58] Field of Search .................. 75/10.41; 266/47; 373/9

[56] References Cited

U.S. PATENT DOCUMENTS 3,610,795 10/1971 Antoine ........................ 373/9
3,708,599 1/1973 Krause .......................... 373/9
4,200,452 4/1980 Savov .......................... 75/10.41

FOREIGN PATENT DOCUMENTS 2115011 9/1983 United Kingdom .......... 75/10.41

Primary Examiner—Peter D. Rosenberg
Attorney, Agent, or Firm—Michael J. Striker

[57] ABSTRACT

In an electric furnace for producing ordinary steels, alloy and others by arc heat of electrodes incorporated with gas blowing from a furnace bottom into dissolving and refining, plugs having fine pipe holes as gas blowing means are positioned in space each other in the furnace bottom for blowing the gas from beginning of refining to tapping in amount of 1 to 40 N/min per one pipe hole, 20 to 800 N/min per one plug, and at pressure of less than 10 kg/cm².g, so that the heats upheaves swell in height of less than 1000 mm, preferably $50 < \Delta h < 500$ mm. The gas is blown in a melting period to splash up the molten metal toward solid raw scraps. Further, a part of the molten steel produced by a previous charge is stayed in the furnace bottom, and the gas is blown from a charging period of scraps, and the melting time is shortened.

21 Claims, 11 Drawing Sheets

FIG_1
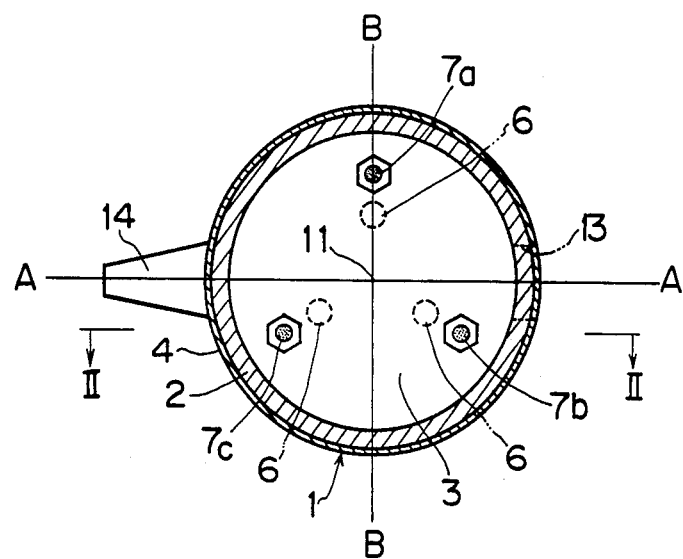
FIG_2
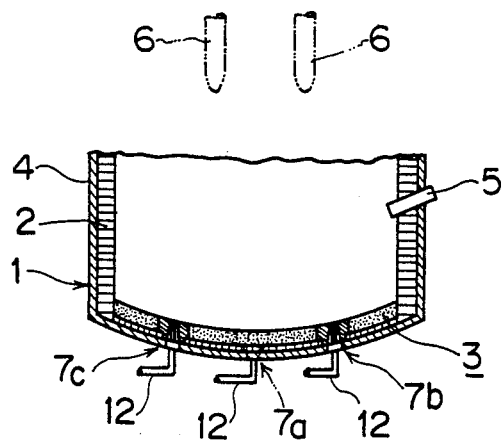

FIG_2(a)
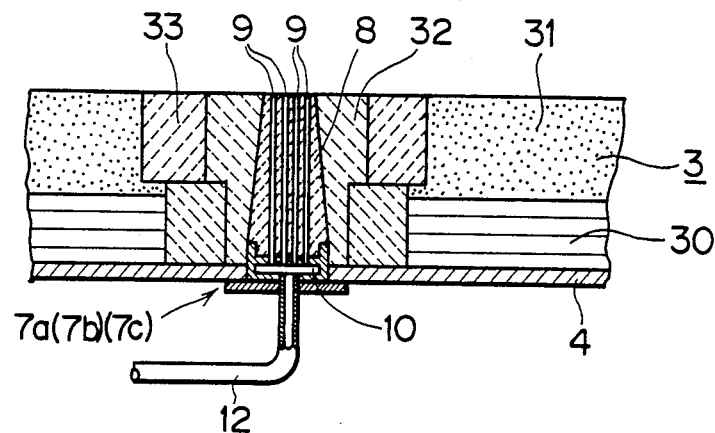
FIG_2(b)
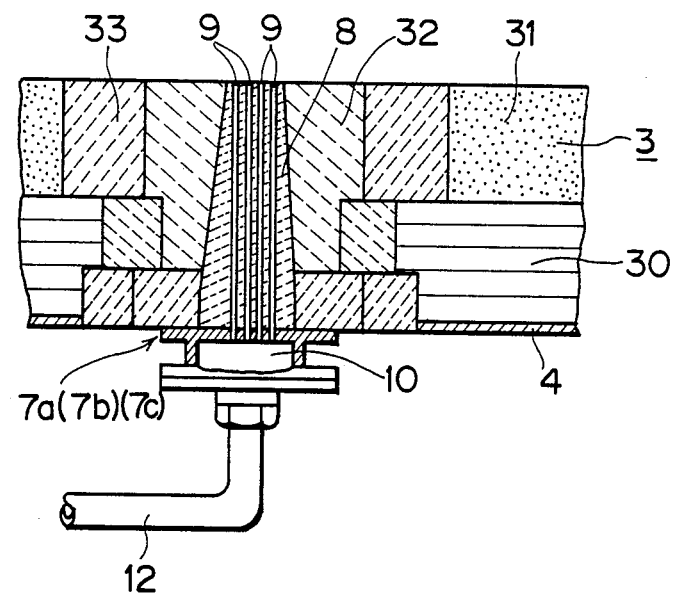

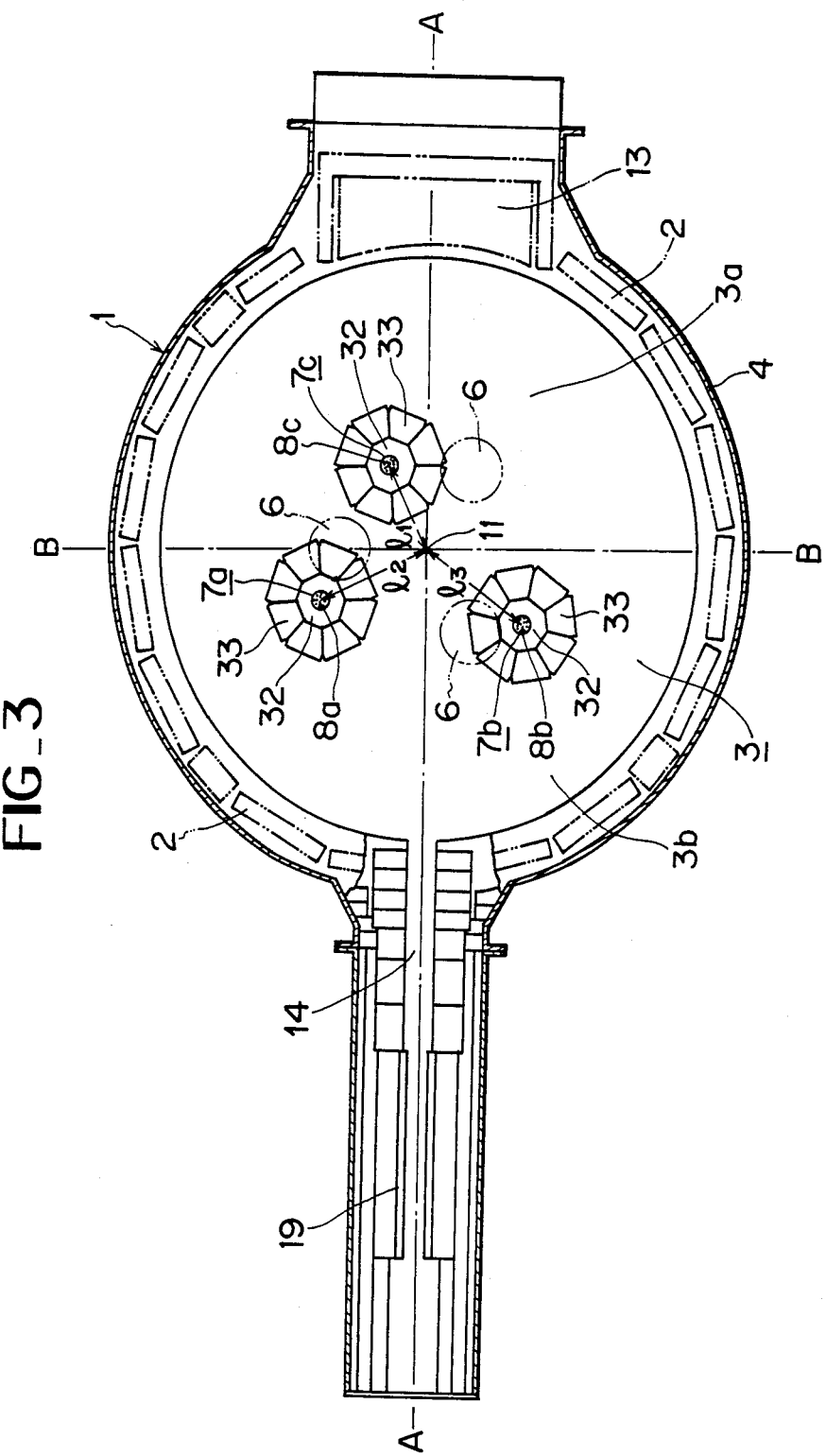

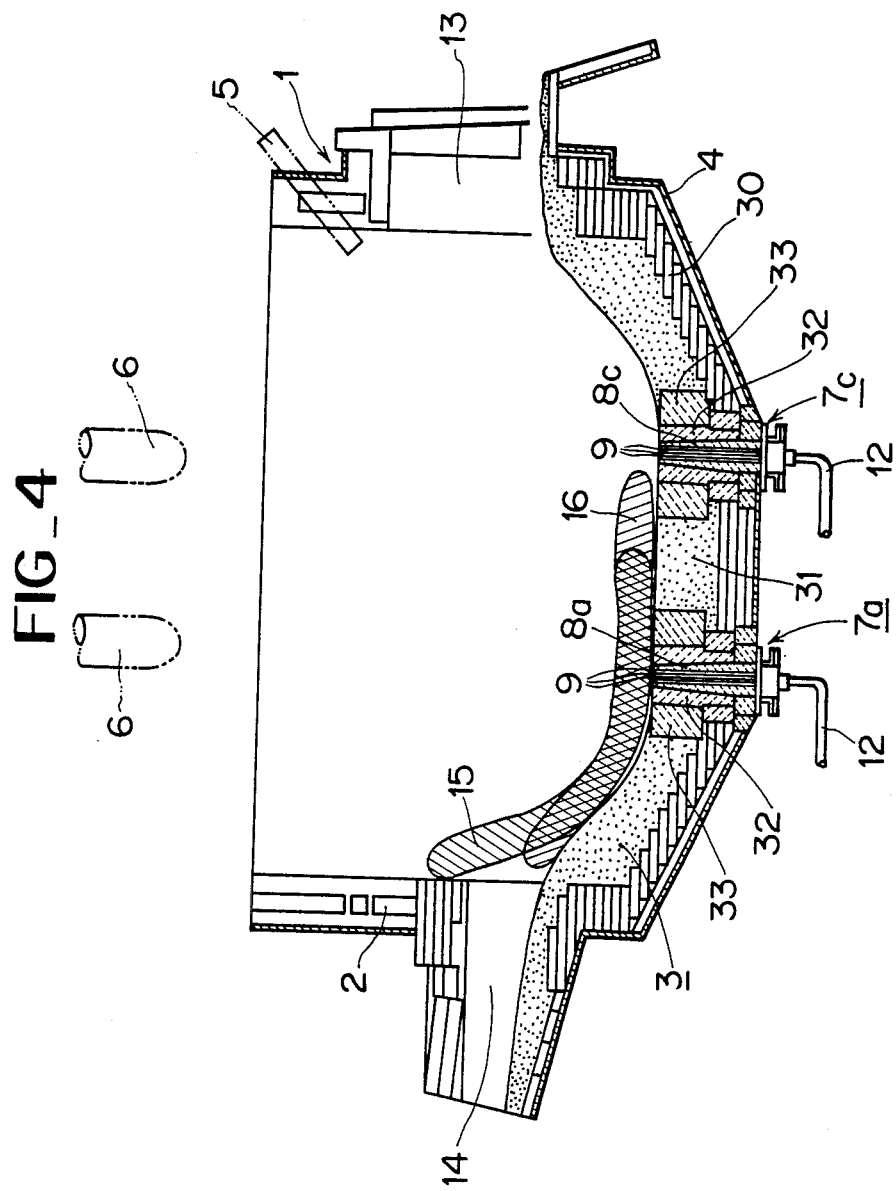
FIG_4

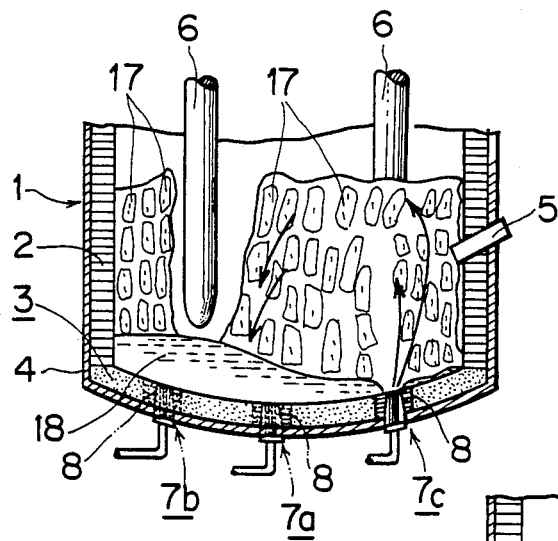
FIG_5
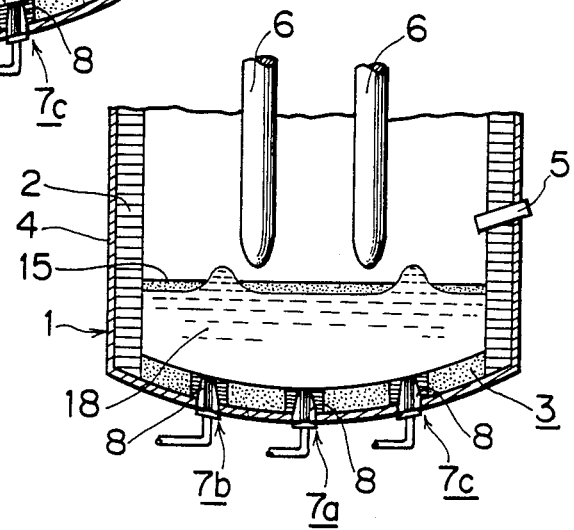
FIG_6
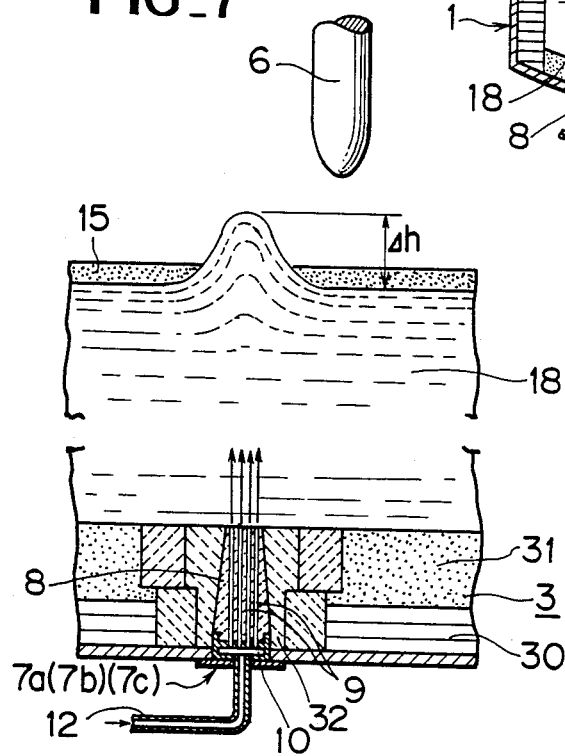
FIG_7

FIG_8
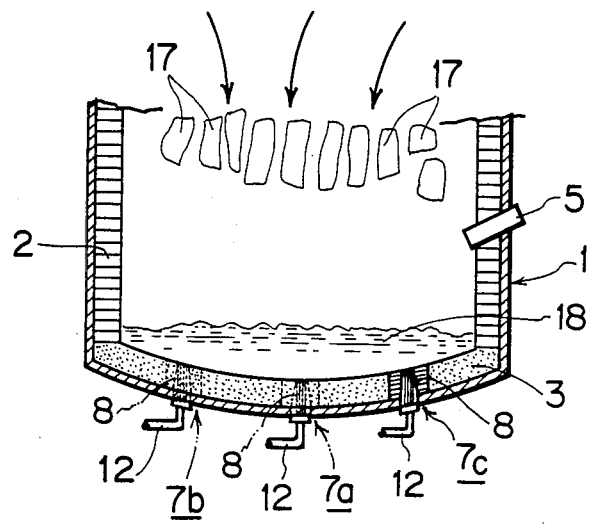
FIG_9
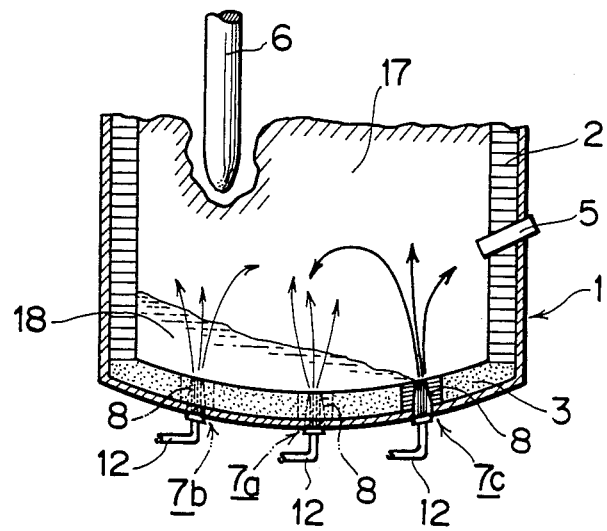

FIG_10
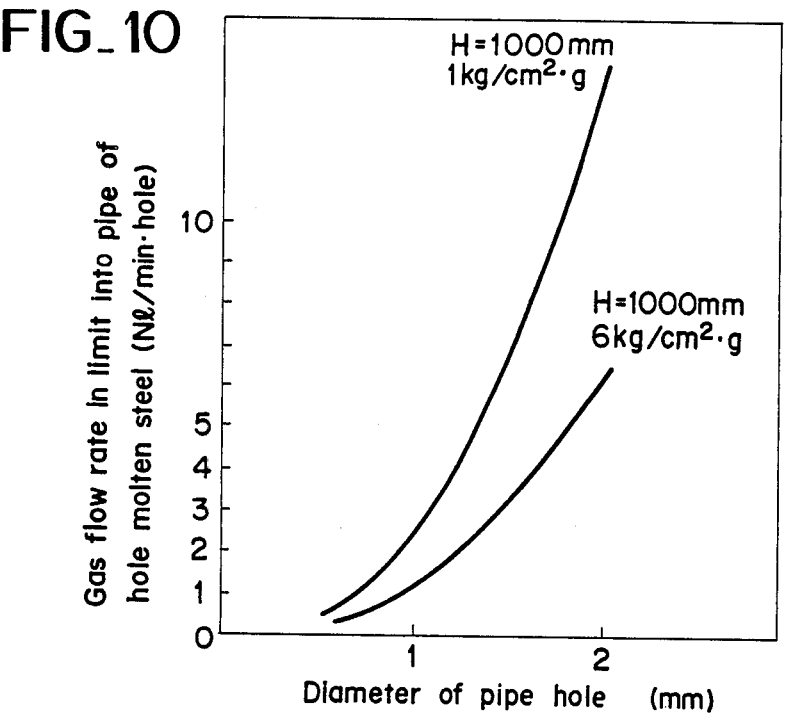
FIG_11
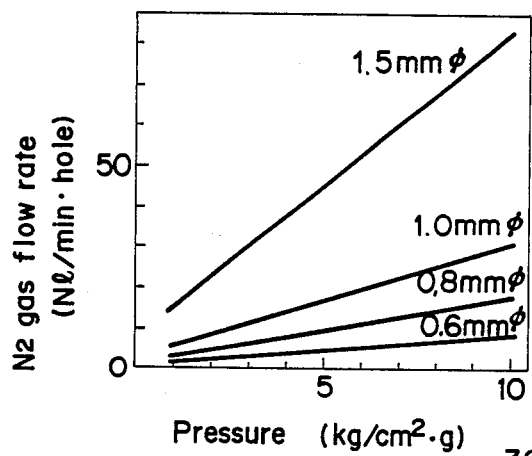
FIG_12
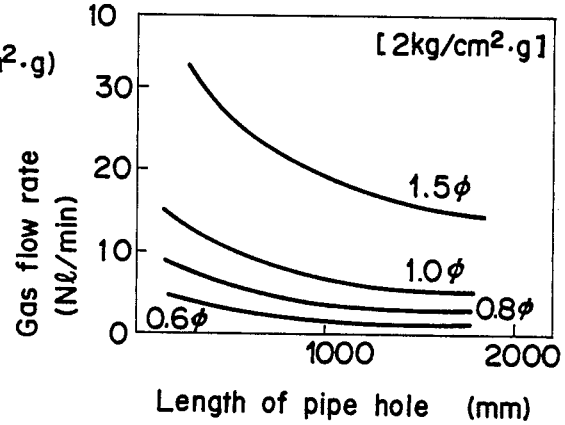

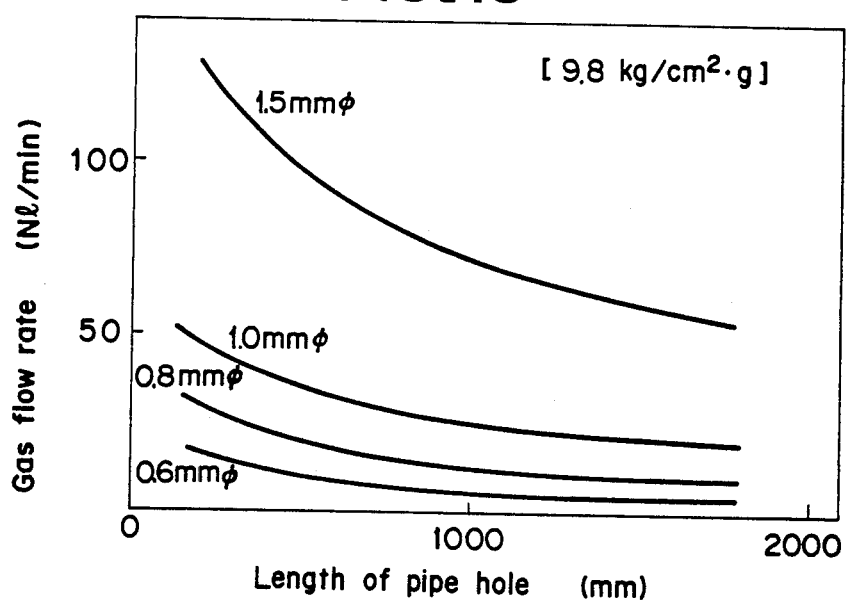
FIG_13
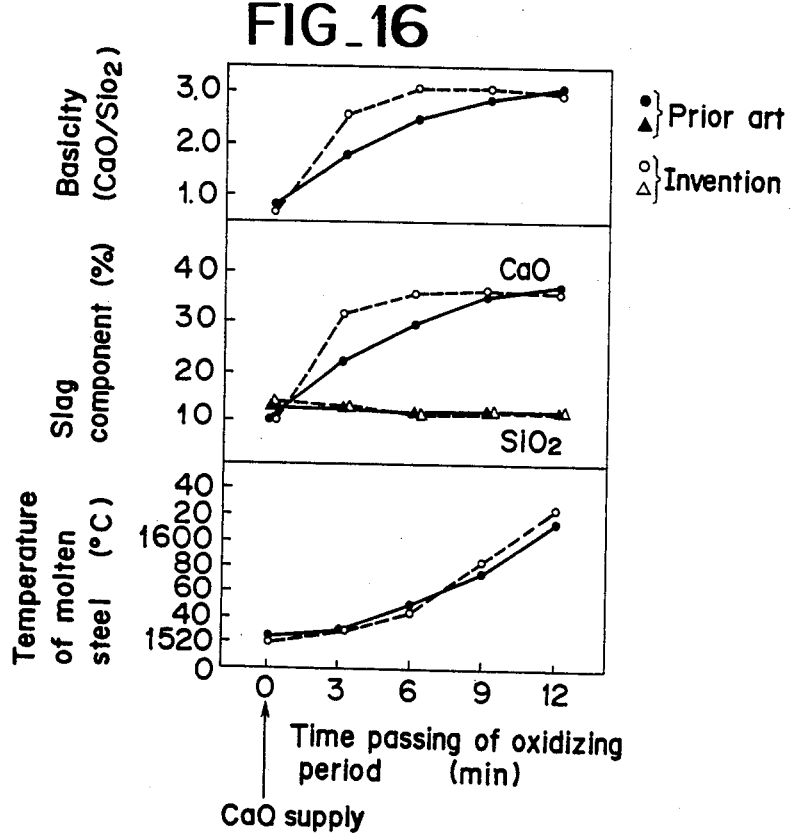
FIG_16

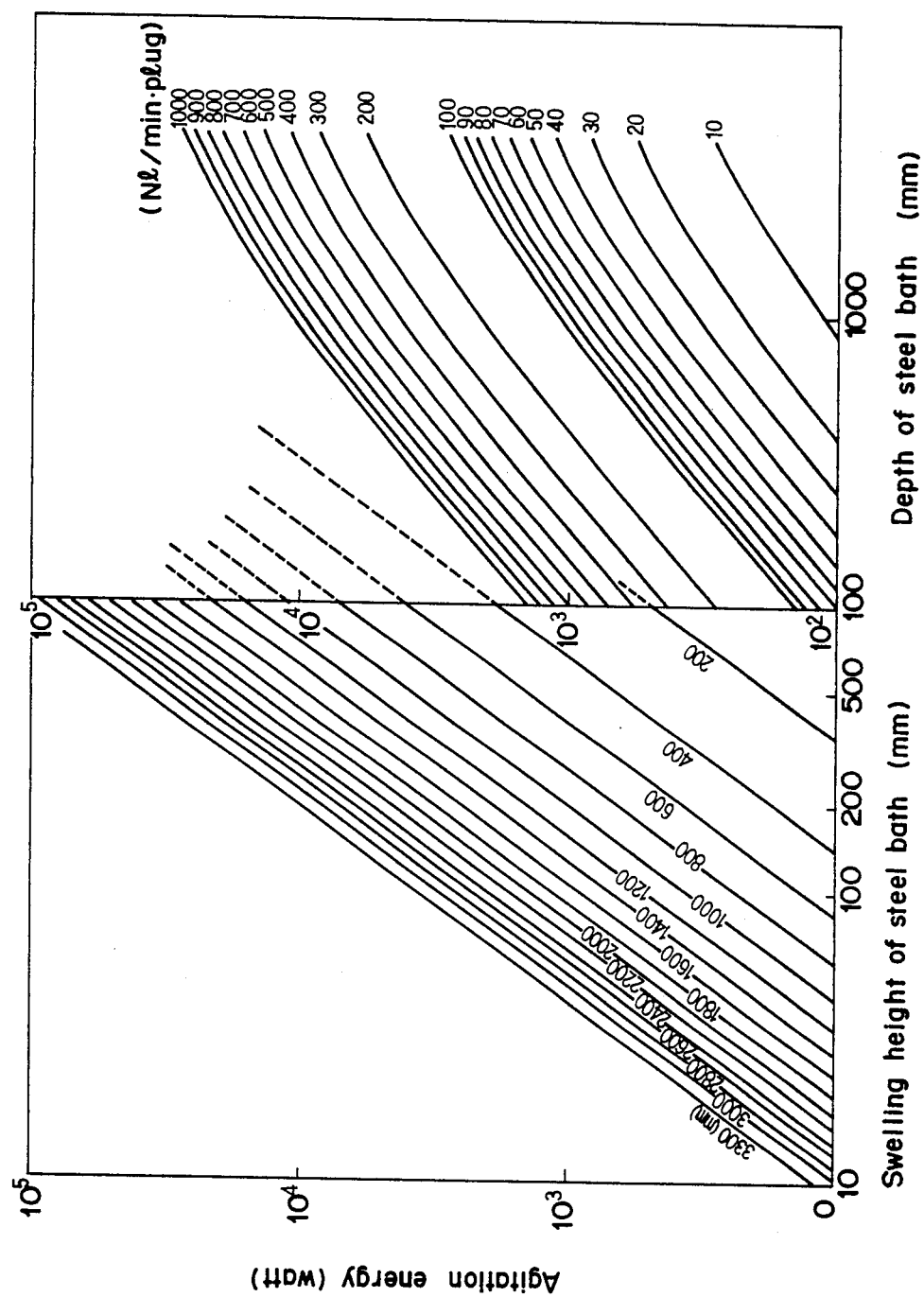
FIG_14

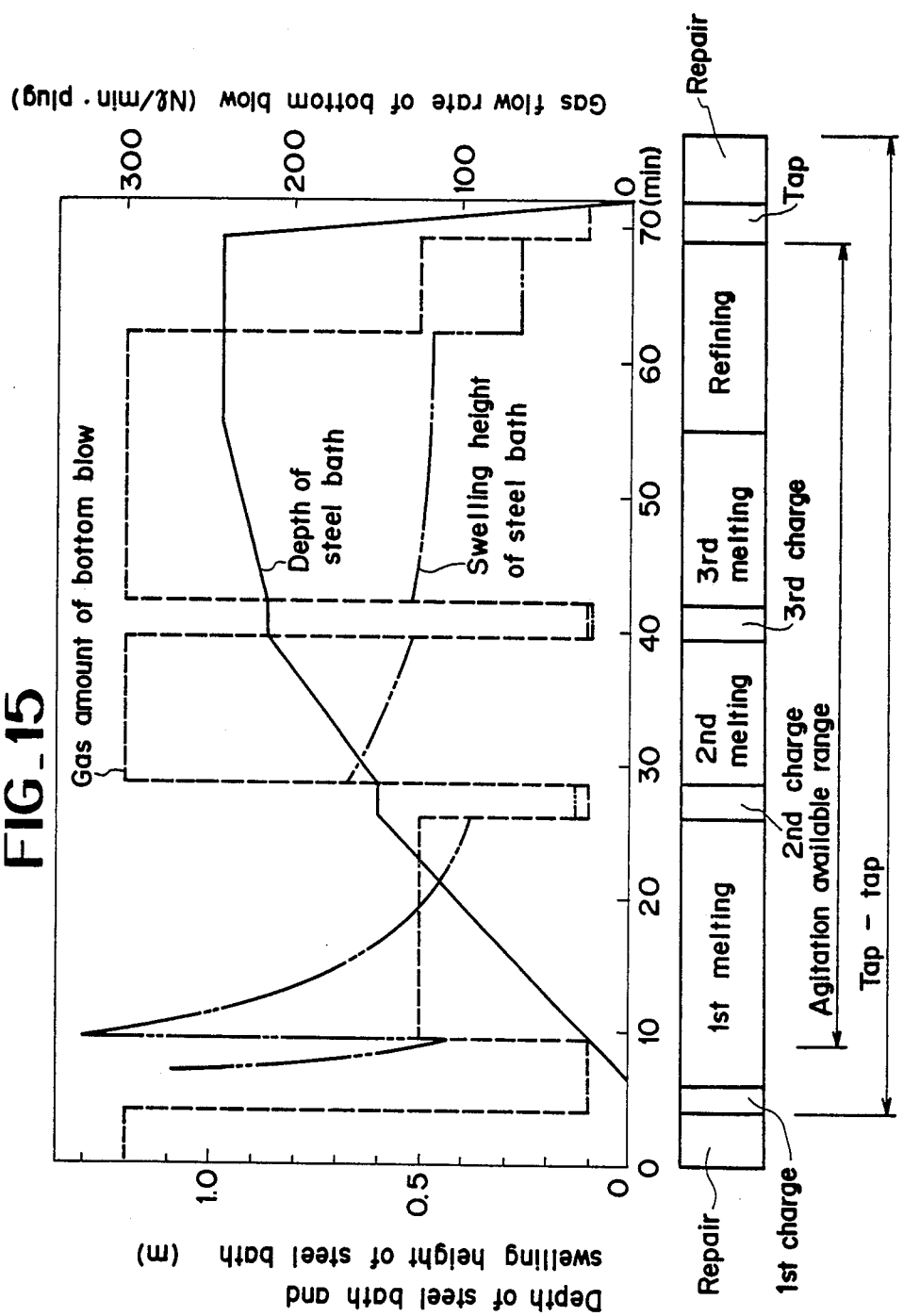
FIG_15

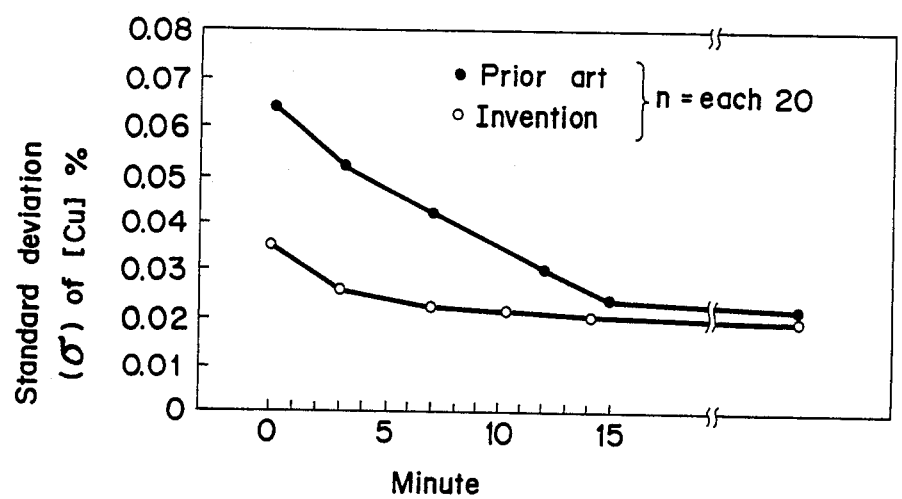
FIG_17
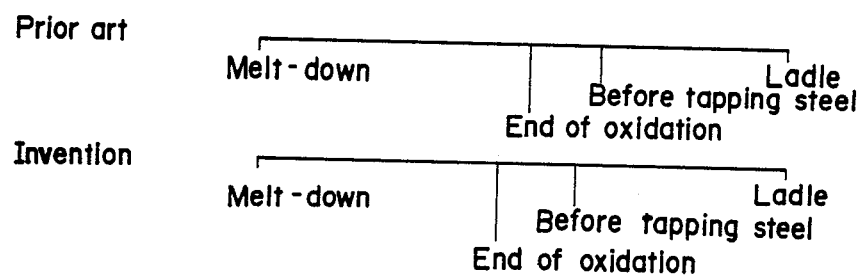
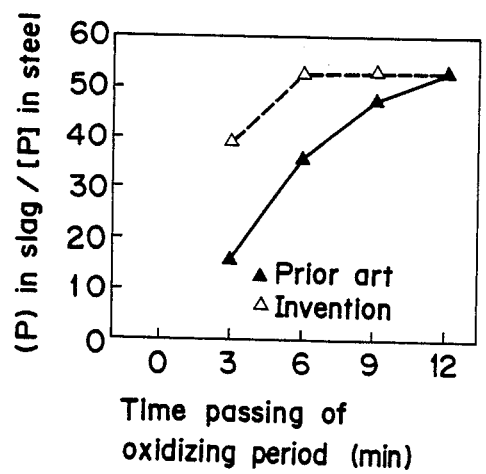
FIG_18
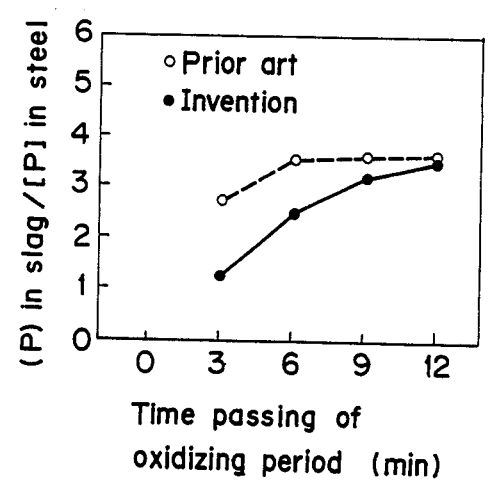
FIG_19

METHOD OF BOTTOM BLOWING OPERATION OF A STEEL MAKING ELECTRIC FURNACE

BACKGROUND OF THE INVENTION

This invention relates to an operation of a steel making electric furnace, and more particularly to a method of incorporating gas blowing from a furnace bottom into melting and refining operations for ordinary steel or alloy by arc heat of electrodes in an electric furnace.

AC arc electric furnaces have been used for melting and refining operations for ordinary steels, alloys or stainless steels. The operation of the electric furnace is basically carried out by charging main scrap raw materials, making an arc directly between the raw materials and electrodes to thereby melt the raw materials, then supplying suitable sub-refining raw materials to provide molten steel of required composition, tilting a converter per each time and tapping the steel and repairing weakened parts of refractory bricks, and repeating scrap charge.

Conventionally, slag-metal in reaction, or the components moving in the steel bath have been controlled by diffusion rate determination. With respect to P and S, for example, they were $2 \times 10^{-5}$ cm$^2$/s and $4 \times 10^{-5}$ cm$^2$/s in the molten metal, and they were $4 \times 10^{-6}$ cm$^2$/s and $2 \times 10^{-6}$ cm$^2$/s in the slag. Therefore, said reaction and movement were slow, and an arc energy transmission was limited, so that following problems occurred.

(1) There is no room for increasing Fe yield. For example, assuming that total Fe content (T.Fe) in the slag is 20% and the slag amount per product steel is 50 Kg/T, a loss arises that the Fe content of 10 Kg/T is moved into the slag.

(2) Distribution of temperature and components in a layer of slag and metal remaining in the furnace become easily ununiform, and non-molten solids could stay until a refining end.

(3) Since the components moving between the steel and the slag are only slightly diffused from boundary of the slag and the steel the moving speed is easily missed, and since not only (C) but also (Mn), (P), (S) and (O) depend upon the diffusion rate determination, and much time is taken for reaction.

(4) The arc energy is absorbed in the slag layer, and the arc heat is limited narrlowly around the electrodes, and the heat transmission is limited, so that electric power is largely consumed (5) Alloy iron and deoxidizing agent to be inherently used for reducing the metal are oxidized by the slag, and they are unnecessarily consumed.

As measurements for the above mentioned matters, one method has been adopted that oil blowing auxiliary burners are provided in a furnace wall above a slag line, or oxygen blowing lances are provided instead of the burners. This method is effective for acceleration of melting the scraps above the slag line, however not so under the slag line, and since the steel bath could not be agitated, this method is hardly effective for transmission of the arc energy and for acceleration of metalurgical reaction.

Another method has been proposed, which blows the gas within the furnace from a lower part of the side wall or the furnace bottom in the operation of the electric furnace. But each of them has practical problems.

One of the above methods installs gas blowing pipes at the lower part of the furnace wall corresponding to a cold zone (not opposing parts between electrodes, that is, parts of the furnace wall about the electrodes), and blows gases into the steel bath at low temperature in the cold zone. However, the bath at the low temperature only moves within the furnace, and the melting and refining could not be accelerated so much. Further, this method is not regulated in the proper amount and pressure of blow ing the gas. Since much gas is supplied, the gas using efficiency is inferior.

Another method disposes a plurality (more than 30) of nozzles (single hole) in a concentric circle of the furnace bottom except the parts under the electrodes, and blows the oxygen in a melting period and an inert gas in a refining period. However, since too many nozzles are disposed, the furnace bottom is weakened in strength therearound, and damages of the refractory become extreme, and much time is required for reparing but it results in prolonging the steel making time. There are many dangerous cases in which the steel bath leaks from the gas blowing nozzles. In addition, as the amount and pressure of blowing the gas are not regulated, the an excessive amount of gas and pressure would be used, so that the bath would be chilled or bubbled in the surface, and electric current would be made unstable and consumed a lot, and a basic unit of electric power would be increased.

Each of the above mentioned methods might be expected to a certain extent in the heat conductivity to the cold zone adjacent to the hot zone in the period of melting the scraps. But this is unsatisfied in the heat conductivity to the upper layer of nonuniform scraps which substantially occupy the space within the furnace. So, the shortening of the melting time has naturally been limited.

SUMMARY OF THE PRESENT INVENTION

The present invention has been developed to solve the above mentioned problems through many studies and experiments.

It is a primary object of the invention to provide a method of bottom blowing operation of a steel making electric furnace which incorporates blowing the gas from the furnace bottom, causes the gas to work in the molten steel most efficiently, and increases the agitating energy without chilling the steel bath so as to provide the acceleration of the metallurgical reaction between the metal and the slag, uniformalization of proper temperature of the steel bath, shortening of the refining time and increasing energy efficiency.

It is another object of the invention to provide a method for this kind of electric furnace which, in addition to the above said effect, accelerates melting of the scraps, especially carrying out the heat conductivity by the molten steel per height of the piled scraps in the furnace, and can finish the melting process in a considerably short period of time.

It is a further object of the invention to provide a method for this kind of electric furnace which utilizes the heat quantity of the molten steel as dynamic heat energy by blowing the gas, the molten steel being retained in the furnace, on purpose so as to largely shorten the melting time of the scraps and further increase the production and decrease the basic unit of the energy.

It is a still further object of the invention to provide a method of this kind of electric furnace which may prolong lives of gas blowing means, and reduce time to be required for exchanging said means, whereby the operation of the furnace may be largely increased, and the agitation by the gas blowing may avoid the molten steel from leaking from the furnace exit to the outside by bubbling action of the steel.

For accomplishing the above mentioned objects, many studies and experiments were made with respect to the best conditions of the gas blowing from the furnace bed to be incorporated into the arc heat, and a gas blowing structure is made special, and the gas blowing amount and pressure are made quantitative, and the swelling height of the molten steel is controlled within a determined scope.

In the invention, plugs having a plurality (not more than 50) of pipe holes that are fine in diameter, preferably 0.6 to 1.5 mm, are disposed as gas blowing means and spaced apart from each other in the furnace bed. In a duration of a period beginning the refining of the steel where the melting of supplied scraps is almost finished to a period of tapping the steel, the gas is blown continuously or intermittently into the furnace in an amount of 1 to 40 Nl/min per one pipe hole, 20 to 800N l/min per one plug, at a pressure of less than 10 kg/cm$^2$·g, and at the swelling height $\Delta h$ of the steel bath being not more than 1000 mm, preferably $50 < \Delta h < 500$ mm. This is a basic operation.

The invention is further characterized by blowing the gas not only in a refining period but in the melting period. The gas is blown into the furnace continuously or intermittently from the gas blowing means at the same time as charging the scraps or at the latest a period from a time close to the electric conduction to a time almost at the completion of the melting. The molten materials, pig iron or steel remaining in the furnace bottom, are blown up as splashes toward the scraps of irregular form occupying the space within the furnace so as to impart the heat energy to the scraps, and after melting the scraps the gas blowing operation is continued under the above mentioned conditions.

Depending upon the present structure, the melting efficiency is increased, and, as a result, the basic unit of electric power is decreased. By making slags earlier, an operation of high basicity is possible from the beginning of the melting, and the basic unit of CaO is decreased. From the melting to the refining, the reaction of slag-metal is accelerated. Therefore, first, as total Fe remaining in the slag is decreased, a yielding of Fe is increased. Second, as (O) in the metal is lowered, the yieldings of deoxidizing agent and alloy Fe are increased. Third, since desulfurization and dephosphorization are heightened, the basic unit of CaO is decreased. Fourth, since decarburization effect is heightened, low carbon materials may be produced. Fifth, as the temperature of the molten steel may be uniformalized, product qualities are made uniform.

Further due to the agitation by the gas blowing, the content of FeO in the slag is lowered and the temperature of the steel bath is uniformalized, so that melting-loss of the furnace wall refractory is little, and the basic unit of repairing materials is decreased. In addition, since the refining time is shortened, the yielding efficiency is increased and the basic unit of the electric power is decreased. These effects may be provided with the reasonable gas amount and without winding up the electrodes.

The invention is further characterized, in order to increase the heat conduction by blowing the gas from the furnace bed, by intentionally leaving in the furnace a determined amount of the molten steel having been produced in a previous charge, preferably 10 to 30%, blowing the gas through the gas blowing means installed in the furnace bed at pressure and amount to an extent that the molten steel remaining at the maximum does not flow out while supplying the scraps, blowing the gas continuously or intermittently just after the electric conduction to the finishing of melting the scraps, blowing up the molten pig iron, the remaining steel and the molten scrap to make a swelling in concave toward the irregularly formed scraps occupying the space in the furnace. The gas blowing is carried out from the finishing of the melting the scraps to the tapping of the molten steel.

In the steel making processes by the electric furnace, there has been a steel remaining process (a part of molten steel having been refined by the electric conduction is stayed in the furnace, and the scraps are supplied thereto and a subsequent melting-refining is carried out). Its object was only to utilize, as a static energy, heat quantity of a steel-making furnace (contain ing the molten steel provided by melting and refining) having a huge heat capacity.

The present invention is not limited to only utilization of simple and static heat quantity, but combines a dynamic bottom blowing steel making process, so that the steel-making efficiency may be far improved by synergestic effect thereof.

Many other features of this invention will be apparent from detailed descriptions as mentioned hereinafter.

BRIEF DESCRIPTION OF THE DRAWINGS

FIG. 1 is a cross sectional view showing an outline of an electric furnace to be used in the invention;

FIG. 2 is a vertically cross sectional view along II—II of FIG. 1;

FIGS. 2a and 2b are cross sectional views of a furnace bed exemplifying gas blowing devices of the invention;

FIG. 3 is a cross sectional view showing another embodiment to be used in the invention;

FIG. 4 is a cross sectional elevational view showing the gas blowing device in the same perpendicular plane in the furnace of FIG. 3;

FIG. 5 is a cross sectional elevational view showing schematically an operation in a melting period of the invention;

FIG. 6 is a cross sectional elevational view showing schematically an operation in a refining period;

FIG. 7 is a partially enlarged view of FIG. 6;

FIGS. 8 and 9 are cross sectional elevational views showing stepwise and schematically operations of other embodiments;

FIG. 10 is a graph showing relationship between diameter of pipe hole and the gas flow rate of the molten steel into pipe holes;

FIG. 11 is a graph showing relationship between the pressure and gas flow rate;

FIGS. 12 and 13 are graphs showing relationshiup between length of the pipe hole and the gas flow rate;

FIG. 14 is a graph showing relationships of bath depth-agitation energy-swelling height of molten steel;

FIG. 15 is a graph showing operation patterns according to the invention;

FIG. 16 is graphs comparing the invention and the prior art in oxidizing time, basicity, slag composition and temperature of heats;

FIG. 17 is a graph showing standard deviation of Cu content in products investigated from melt-down;

FIG. 18 is a graph showing variances of P in slag/-steel per each of time passing investigated from melt down; and FIG. 19 is a graph showing variances of S in slag/-steel per each of time passing investigated from meltdown;

DETAILED DESCRIPTION OF PREFERRED EMBODIMENTS OF THE INVENTION

FIGS. 1 to 4 show outlines of an electric furnace to be used to the invention, and FIGS. 2a and 2b show partially enlarged furnace bottoms.

A furnace body 1 is formed with a side wall of refractory bricks inside of an iron sheel 4 and a furnace bed 3 at a lower part thereof. The side wall 2 is provided with a working mouth 13 and an outlet 14 almost symmetrically, and the former is used for discharging slags or changing sub-raw materials. The furnace bed 3 commprises, as shown in FIGS. 2a and 2b, permanent bricks 30 and dry stamp materials 31 thereon.

An auxiliary combustion means 5 is provided at the side wall above the slag line, for which an oxygen blowing lance or/and hydrocarbon fuel blowing burner are used. Above are electrodes 6.

A plurality of gas blowing means 7a, 7b, 7c pass through the thickness of the furnace bed 3, which comprises, as shown in FIGS. 2a and 2b, tapered refractory plug 8, fine pipe holes 9, 9 passing through the entire height of the plug 8, and gas distributor 10. The plug 8 is fitted in a tuyere brick 32 disposed in the furnace bed 3, and the tuyere brick is secured by a building brick 33. The gas distributor 10 may be arranged inside of the iron shell 4 as shown in FIG. 2a or outside thereof as FIG. 2b, and is communicated via a pipe 12 with a gas source (not shown).

The narrow pipe holes 9, 9 are employed in this invention, because the gas is effected with required penetrating force, while being distributed moderately. With respect to the pipe hole 9, the number to be used is generally not more than 50, for example, about 10 to 50, and the diameter is 0.6 to 1.5 mm, preferably 0.6 to 0.9 mm.

The lower limit of the diameter has been determined to be 0.6 mm. If change less than this, higher pressure would be required for introducing the agitating gas into the furnace. The upper limit has been determined to be 1.5 mm This size is limited for controlling a swelling height $\Delta h$ of the molten steel to not more than 1000 mm with respect to a later mentioned gas blowing amount and pressure. The diameter of not more than 0.9 mm has an advantage in that the molten steel does not come into the pipe hole if the gas does not run therein, so that no problems arise during a stopping time of an intermittent gas blowing period. This fact has been confirmed experimentally. The pipe holes may be formed by directly piercing the plug, but preferably by providing for the passage of heat resistant metal pipes. In a latter case, there is provided a mechanism for avoiding occurrence of induction electric current, but having no relation with the present invention, an illustration is omitted.

The gas blowing means 7a, 7b, 7c preferably number three in ordinary operations. If the number of pipe holes is less, the agitation is insufficient, but if too many, the furnace refractory thereraround becomes damaged requiring much time to repair, and in addition the bath is moved excessively, and the efficiency of the electric power is spoiled. If the furnace capacity is small, it is enough to have not more than two, and if over 100 T, there may be installed about five.

In view of effective utilization of the heat, the means 7a, 7b, 7c should be placed in a hot zone except for parts under the electrodes. In the example of FIG. 1, the devices 7a, 7b, 7c are placed almost equidistantly in a concentric circle around a furnace axis 11, but the embodiment is not limited thereto. That is, the means may be positioned non-equidistantly in a non-concentric circle.

In FIGS. 3 and 4, the gas blowing means of more than two are installed in a range to be effected with slag-coating. If the furnace bed is divided by planes into two sections of an inlet range 3a and an outlet range 3b with a line A—A running through centers of an inlet 13 and an outlet 14 and a transverse line B—B running through the furnace axis 11, that is, if the three means 7a, 7b, 7c are used, the two means 7a, 7b are positioned in the outlet range 3b, and one device 7c is positioned in the inlet range 3a.

Reasons and advantages are as follows. In this kind of electric furnace, since a slag making agent is added in the refining period, the slag line is heightened, and the slag is removed about ½ at the ending, but when the steel is tapped, a slag having floated on the molten steel is positioned as shown with 15 in FIG. 4. As is apparent, a plug 8c of the device 7c is not covered with the slag but bared, and plugs 8a, 8b are covered with the slag. When the furnace body 1 is recovered to the operative position, the slag also moves to an initial position. However, due to dropping of the temperature after tapping, solidification of the slag or increasing of viscosity, a slag adheres to the furnace bed as shown with 16 in the same. The plug 8c at the inlet side is therefore positioned at a borderline between a slag-coating and not slag-coating.

The gas blowing means should be installed with as many as possible in the outlet range 3b to be slag-coated, because such an installation is important to prologation of the plug life and advantageous to saving of plug exchanging time. The position to be used with an expensive plug is sufficient with the plug 8c only in the inlet side.

Referring to FIG. 3, between the gas blowing means 7c of the plug 8c in the inlet range 3a and the furnace axis 11 is a distance $l_1$, and between the devices 7a, 7b of the plugs 8a, 8b and the furnace axis 11 are distances $l_2$, $l_3$. The distance $l_1$ must be smaller than the latter distances for the following reason. In the operation according to the invention, since the gas is blown to the extent of swelling of the molten metal and the level of the outlet is higher than that of the inlet, and unless the plugs in the inlet sides are biased to a radius of the furnace bed, the molten steel flows out from the inlet 13 by a bubbling phenomena.

As in the present example in which three gas blowing devices 7a, 7b, 7c are used, it is preferably that the outlet side b should be provided with a greater number of devices than the inlet side a. Similarly, the ratio of gas blowing devicws on the outlet versus the inlet side when the gas blowing devices number four is, 3:1, and when they number five is, 4:1 or 3:2, and if they number two, one is in the outlet range and the other is also in the outlet range nearly to the B—B line.

In FIGS. 3 and 4, an outlet shoot 19 is provided. The same parts as in FIGS. 1 and 2 are given the same numbers.

FIGS. 5 to 7 show outlined operations of the invention. For operation, scraps 17 are supplied into the furnace by a bucket (not shown) In a known manner, and electrodes 6, 6 passing through a furnace cap are electrically turned on, and the scraps become molten by an arc 5 heat. At the same time, oxygen or hydrocarbon is blown from an auxiliary combustion means 5 of the side wall.

The gas is blown into the molten steel 18 from the gas blowing devices 7a, 7b, 7c continuously or intermittently through the overall period from beginning of the refining where melting of the scraps is almost finished to the steel tapping. The gas is supplied from the source via the pipe 12, and pressure is uniformalized in the gas distributor 10 and the gas is jetted out in dispersion from the pipe holes 9 of the plug 8.

For the gas such to be used, inert gas as $N_2$, Ar or the like is desirable so as to avoid damage to the plugs or the furnace bed. Depending upon materials of the plug or furnace bed, oxidizing gas such as oxygen, oxygen enriched air or air, and reducing gas such as propane gas may be used together with the inert gas selectively in response to the operating phases. Each of the gases must be blown under following conditions.

(1) The gas blowing amount is set 1 to 40N l/min per pipe hole and 20 to 800N l/min per plug, irrespectively of the furnace capacity.

(2) The gas blowing pressure is set less than 10 $kg/cm^2 \cdot g$.

(3) Under the above conditions of (1) and (2), the swelling height of the molten bath, i.e., the distance $\Delta h$ from the heat surface to the top of the swelling as shown in FIG. 7 is controlled to be not more than 1000 mm, preferably $50 < \Delta h < 500$ (mm).

The above mentioned matters are necessary conditions for agitating the steel bath with a small amount of gas at maximum efficiency in the electric furnace having comparatively short depth (within about 1500 mm), not necessitating winding up the electrodes in the refining period nor chilling the molten steel unnecessarily. These findings are characteristics of the invention.

With respect to determination of the gas blowing amount, if the pipe holes of 0.6 to 1.5 mm diameter are provided not more than 50 per one plug, and if the diameter exceeds 0.9 mm, it is impossible to avoid solid foreign matter, molten materials or molten steel from going into the pipe holes 9, and if the blowing amount is less than 1N l/min, clogging thereby and leakage outside. Further, in each of the diameters, the swelling height $\Delta h$ is absent in the refining period, so that the steel and the slag are not given enough agitating energy.

FIG. 10 shows relationship between the pipe hole diameters and intrusion of the molten steel with respect to the bath depth (H) of 1000 mm and the gas blowing pressure of 1 $kg/cm^2 \cdot g$ and 6 $kg/cm^2 \cdot g$ from which it is seen that a gas amount of more than 1N l/min is required.

The upper limit of 40N l/min is determined although solid foreign matter, molten material or molten steel do not enter the pipe holes in the blowing amount. The molten metal splashes on the inner surface of the furnace cap and the side wall, and the swelling height $\Delta h$ of the molten metal exceeds 1000 mm so that the molten metal splashes alot on the electrodes, and troublesome winding-up of the electrodes is forced to be done.

The determination of the amount of 20 to 8000N l/min per one plug is the reason that the total blowing amount is too much and cools the molten metal unnecessarily, and the gas is consumed more, in addition to the same reason.

The present invention is further characterized by limiting the gas pressure less than 10 $kg/cm^2 \cdot g$. The lower limit is in general 1 $kg/cm^2 \cdot g$ the molten steel can be avoided from intruding into the pipe holes with this pressure since the diameter of the hole is made small, an effect expected by the invention may be obtained with this pressure. The upper limit 10 $kg/cm^2 \cdot g$ is set because a satisfactory effect may be obtained with low pressure, and an agitation more than required is not necessary.

FIG. 11 shows relationship between pressure and gas flow rate where the thickness of the furnace bed is 700 mm (nearly equal to length of the pipe hole) per each of the hole diameters. FIG. 12 shows the relation between hole length and the gas flow rate where the gas pressure is 2 $kg/cm^2 \cdot g$. FIG. 13 shows the relation between hole length and the gas flow rate where the gas pressure is 9.8 $kg/cm^2 \cdot g$. The gas blowing conditions may be selected from FIGS. 10 to 13.

The invention controls the gas blowing amount and pressure at the swelling height $\Delta h$ of the molten metal being not more than 1000 mm, preferably $50 < \Delta h < 500$ (mm) in each of the operating periods. The swelling height h is determined by $$h = K \cdot H^\alpha \cdot E^\beta.$$

Herein, H is the bath depth (m), E is agitation energy (watt) to be given to the steel bath, and K, $\alpha$, $\beta$, are constants given experimentally.

The bath depth in the electric furnace is up to 1500 mm, and in this case, K, $\alpha$, $\beta$, are experimentally $1.9 \leq K \leq 2.9$, $-1.40 \leq \alpha \leq -1.46$, and $\beta = \frac{2}{3}$. The agitation energy (watt) is given by controlling the gas blowing amount and the pressure thereof. If factor different from the above mentioned, for example, a formula of a different agitation energy is used, the optimum range of the swelling height is 50 to 500 mm, and the maximum should be not more than 1000 mm.

FIG. 14 is conversion graphs of the bath depth H-agitation energy E-bath swelling height $\Delta h$-gas flow rate per one plug in the bath temperature being constant (1550° C.). In actual operation, the conversion graphs per FIG. 14 are prepared per each bath temperature, or the data programmed in an electronic control unit such as a microcomputer, thereby enabling the setting of the gas blowing amount and the pressure thereof.

In addition, the invention includes the gas blowing in the melting period not during the beginning period where the melting of the scrap is almost finished to the tapping of the molten steel. The gas is blown continuously or intermittently by the gas blowing means 7a, 7b, 7c, preferably at the same time as starting the charging of scraps 17, or from at the latest when charging of the scraps is finished and the electrodes 6 are electrically turned on and melting of the scraps is begun so that the dissolution of the scraps is almost finished.

The scraps are charged into the furnace, piled irregularly, molten around the electrodes 6 and gathered on the bottom of the furnace. The molten metal 18 is blown up in splashes as arrows of FIG. 5 indicate to a height of scraps 17 by the pressure from the means 7a, 7b, 7c, or moved upward through spaces or openings among the scraps to the uppermost light materials such as iron, and then drop through said spaces. Again the molten metal 18 is splashed up and gives heat energy to raw scraps.

By these repetitions the heat balance is rapidly effected in the furnace.

While the scraps mainly remain as raw solids, the charged materials stay in spaces in the inside of the slag line, the furnace cap and side wall. Therefore, if the gas is blown more at a pressure higher than during the refining period, the splash does not reach the upper part by the charged raw solids on the way, and do not adhere to the electrodes, their the, inner surface of the cap on, upper parts of the side wall.

Therefore, it is not necessary to especially regulate the gas blowing condition (amount and pressure) at the same time as the refining period. The gas is blown to an extent of blowing up the molten metal on the furnace bottom, so far as the inside of the furnace is not cooled by excessively blowing the gas. Rather a problem occurs about the lower limit of the gas blowing. With the flow rate of the gas of less than 1N l/min per one hole, the foreign matter or the molten materials cannot be prevented from entering into the pipe holes. So, the lower limit should be more than it. For the same reason, the gas flow rate per plug should be more than 20N l/min.

With respect to the lower limit of the gas blowing pressure, in view of preventing the molten metal from going into the pipe hole and the splashing effect expected by the invention, it is generally 1 kg/cm². The upper limit is not particularly determined in view of handling, it will be enough with 10 kg/cm²·g or more.

The gas flow rate and the pressure in the melting period may be constant all through the blowing period under the above conditions. Preferably, when charging the scraps or just after beginning to melt them, such amount and pressure will be enough to prevent the foreign matter or the molten materials from going into the pipe holes, that is, a blowing amount and pressure near to said lower limits. Both are increased after waiting for a certain melting amount, and further increased in response to the amount melting in oblique lines or stepwise.

If the molten metal 18 gathered on the furnace bottom are splashed and adhere to raw scraps 17, the gas blowing is reduced to said lower limit. When the molten metal gather, the gas is blown. The additional supply of the scraps is the same. If the diameter of the pipe hole is 0.6 to 0.9 mm, the gas blowing may be stopped as said above.

After the scraps are molten, the gas blowing amount and the pressure are further increased so as to control the swelling height Δh of the heat as shown in FIG. 7, to thereby provide satisfied agitation effect, so that the reaction of the metal and the slag may be accelerated and the bath temperature may be uniformalized.

FIG. 15 exemplifies operation patterns in one charge (bath depth, bottom gas blowing amount and swelling height), where total agitation energy of 0.166 KWH/T was obtained with the used gas amount of 41.5 NM³/charge. In this example, the gas is blown moderately from main charging to the first melting period after the electric conduction, and the gas is blown strongly in the second and third melting period, and subsequently the strong blowing is also continued in the refining period, and the gas blowing condition is lowered at the end of the refining period.

FIGS. 8 and 9 show other operations. In the operation shown in FIG. 5, the gas is blown from the furnace bottom when charging the scraps or at the latest after the electric conduction, but since the molten metal hardly exists at beginning of melting the scraps, the splash effect is delayed. Therefore in this example, all the amount of the molten steel is not tapped, and part of the molten steel 18 is intentionally left in the furnace.

The scraps 17 are charged while blowing the gas from the gas blowing device 7. The gas blowing at this time is at least a condition of preventing the steel from going into the pipe hole, that is, said blowing lower limit in the melting period (more than 1N l/min, more than 20N l/min per one plug and pressure of more than 1 kg/cm²·g), and the upper limit is to an extent that the remaining molten steel 18 does not flow outside of the furnace. When the scraps 17 are charged and the electric conduction is begun, the gas blowing amount and pressure are increased to blow it into the furnace continuously or intermittently.

FIG. 9 illustrates an initial condition of the melting period, and the electrode 6 goes into only an upper part of the scrap 17 while its lower part is immersed in the remaining molten metal 18. The remaining molten metal 18 is splashed up or swelled in concave to the height of the scrap 17 by the strong gas blowing from the means 7a, 7b, 7c just after melting of the scraps. The molten metal 18 contacts the scraps 17 or rise through spaces or openings among the scraps, and parts of the splashes contact the scraps 17 and other parts drop through the spaces or openings. By such a strong gas blowing, the heat balance in the furnace rapidly comes to the equilibrium, so that the melting is accelerated.

According to this method, it is possible to shorten the steel making time and further heighten operating effect. If the remaining molten metal 18 were less, synergestic effect together with the bottom gas blowing would not be provided, but if being too much, the steel making efficiency (T/Hr) would not be increased. Therefore, it is preferably that the remaining steel is 10 to 30%. In this operation, after the melting of the scraps has been finished, the gas is blown in accordance with the above mentioned operating conditions.

Other embodiments of the invention than the above mentioned are enumerated as follows.

(1) The gas blowing devices 7 are not always perpendicular in blowing but may have certain angles. The devices may each change the gas blowing angle respectively.

(2) The gas blowing devices are not always the same in the blowing amount and pressure but may be variable including a zero amount.

(3) The gas blowing amount and pressure are controlled by operating instruments such as valves of a blowing amount detector and a pressure detector provided in a circuit from the source to the gas blowing devices, or operating an autocontrol unit and a sensor including microcomputer, if required, in response to each of the steps and the furnace conditions.

EXAMPLES

Examples of the invention will be shown.

EXAMPLE 1

Ordinary steel was produced by an electric furnace of 50 T.

I. The gas blowing devices were provided with plugs having 20 pipe holes of 0.8 mm φ in diameter, and positioned with spaces of 120° in the furnace bed of the hot zone.

II. Nitrogen gas was sent from supply of the scraps at pressure to an extent that the pipe hole would not be clogged with foreign matter, and when the charged scraps more or less molten, the nitrogen gas was blown 1.5N l/min per pipe hole, 30N l/min per plug and at a pressure of 1 kg/cm²·g. The amount was changed in response to increasing the amount of molten metal produced. The maximum blowing pressure was 9 kg/cm²·g, and the gas was blown each time when the heat gathered on the bottom.

III. Having finished the melting of the scraps, the nitrogen gas was blown 200N l/min per plug and at a pressure at 6 kg/cm²·g, and the swelling height of the heat was controlled to be 120 to 480 mm. Accordingly the electrodes were not wound up. Elements of the baths each time are listed in Table 1.

The above operation results (average values of charges) are compared with the operation without bottom blowing (conventional processes) in Table 2. The molten steel amount was 45450 kg.

In Table 2, the melting time includes the 2nd and 3rd charges. It is seen that the melting time and refining times were shortened, and the production efficiency was increased.

FIG. 16 shows the comparison data between oxidizing period passing time, basicity, slag composition and temperatures, from which it is seen that earlier slag making was possible and the high basicity was maintained for a long period of time.

FIG. 17 shows standard deviations of Cu content in the products from melt-down. In the prior art, as Cu% was not uniform in the molten metal, samples show big differences from each other. On the other hand, in the invention, as the mixture was made uniformly and rapidly, the stable values are shown.

FIG. 18 shows changes of (P) in the slag and (P) in the molten metal per each passing time from the melt-down. FIG. 19 shows changes of (S) in the slag and (S) in the molten metal. In the invention, the both reach equilibrium in a short time.

EXAMPLE 2

The operations were carried out in the electric furnace of 50 T under the following conditions.

The three gas blowing means were positioned in the furnace bed of the hot zone non-concentrically with respect to the axis of the furnace in the manner that the two means were at 925 mm to the outlet mouth from the axis of the furnace bed, and one means was at 685 mm to the inlet mouth from the axis of the furnace bed. The molten metal of about 10 T (about 20% of the total molten metal) of a previous charge were retained in the furnace. The scraps were charged while blowing the gas of 50N l/min per plug and at a pressure of 2 kg/cm²·g, and the nitrogen gas was blown 20 to 800N l/plug while observing the furnace conditions, at the same time as the start of the electric conduction. Also, after having finished the melting, strong gas blowing was continued (the swelling height was controlled to be 50 to 500 mm), and the refining was performed to accelerate the chemical reaction.

Table 3 shows comparisons of operation data of each 6 charges for the present process (A) which uses the remaining molten metal and the gas blowing, the present process (B) in which the gas blowing without returning the molten metal, and the process (C) which retains the molten metal without blowing the gas.

Table 4 shows appreciations in total with numerical values. The amount of $O_2$ used is the data when the oxygen was blown above the slag line by the lance from the furnace wall.

From the above results, it is seen that the present process (A) is far superior in both the amount of electric power used and the steel making efficiency per unit time.

After having refined the 339 heatings, the losses were measured per each of the blowing positions. The results were, at the plugs in the outlet range, 0.35 mm/heating respectively, and at the plug in the inlet range, 0.85 mm/heating. It is seen from the above that if as many as possible of the gas blowing devices are installed in the self-coating range, the life of the plug can be prolonged and time lost due to exchanging of the plugs can be saved.

TABLE 1

| Process | Starting time | Gas flow rate (Nl/min · plug) | Bath depth (m) | Bath temperature (°C.) | Agitating energy (watt) | Swelling height (mm) | Measuring time |
|---|---|---|---|---|---|---|---|
| 1st charge | 10:10 | 30 | — | — | — | — | 10:11 |
| 1st melting period | 10:12 | 30 | 0.10 | 1530 | 43.8 | 700 | 10:16 |
| | | 120 | 0.36 | 1530 | 583 | 700 | 10:24 |
| | | 120 | 0.60 | 1540 | 1530 | 310 | 10:31 |
| 2nd charge | 10:32 | 30 | 0.60 | 1540 | 230 | 140 | 10:33 |
| 2nd melting period | 10:34 | 120 | 0.60 | 1540 | 916 | 370 | 10:35 |
| | 10:34 | 200 | 0.96 | 1540 | 2056 | 480 | 10:45 |
| 3rd charge | 10:46 | 30 | 0.86 | 1540 | 308 | 110 | 10:47 |
| 3rd melting period | 10:48 | 200 | 0.86 | 1540 | 916 | 370 | 10:51 |
| Refining | 10:56 | 200 | 0.97 | 1600 | 2337 | 440 | 10:57 |
| | | 120 | 0.97 | 1620 | 1417 | 316 | 11:04 |
| Tapping | 11:10 | 30 | — | — | — | — | 11:11 |
| Repair | 11:13 | 200 | — | — | — | — | 11:15 |

TABLE 2

| | Prior art | Invention |
|---|---|---|
| Charging time | 2.0 minutes | 2.0 minutes |
| Melting time | 49.2 minutes | 44.2 minutes |
| Refining time | 15.3 minutes | 14.3 minutes |
| Tapping time | 3.2 minutes | 3.2 minutes |
| Repairing time | 8.5 minutes | 8.5 minutes |
| Total | 78.2 minutes | 72.2 minutes |
| Production efficiency (TH/r) | 34.5 | 37.4 |
| Fe content (%) in slag | 15.0 | 10 |
| Basic unit of electric power (KWH/T) | 370 | 353 |
| Basic unit of lime (Kg/T) | 34 | 32 |
| Basic unit of alloy (Kg/T) | 34 | 32 |
| Nitrogen gas (Nm³/T) | — | 0.77 |
| Oxygen (Nm³/T) | 35 | 35 |

TABLE 3

| Heats No. | Tap-Tap (Min) | | | Charge-Tap (Min) | | | Charged scraps (T) | | | Tapping steel (T) | | |
|---|---|---|---|---|---|---|---|---|---|---|---|---|
| | A | B | C | A | B | C | A | B | C | A | B | C |
| 1 | 72 | 77 | 79 | 62 | 65 | 67 | 53.5 | 54.2 | 54.0 | 39.5 | 49.5 | 38.9 |
| 2 | 61 | 75 | 68 | 55 | 64 | 57 | 44.2 | 53.7 | 43.2 | 40.1 | 49.1 | 39.5 |
| 3 | 63 | 76 | 69 | 57 | 66 | 58 | 43.8 | 54.0 | 43.6 | 39.6 | 49.3 | 40.2 |
| 4 | 60 | 75 | 71 | 55 | 64 | 60 | 44.3 | 52.8 | 44.7 | 40.7 | 48.2 | 40.5 |
| 5 | 62 | 76 | 71 | 57 | 64 | 60 | 45.0 | 53.5 | 44.7 | 40.9 | 48.9 | 40.8 |
| 6 | 62 | 75 | 70 | 54 | 63 | 59 | 44.2 | 51.0 | 44.6 | 50.9 | 46.6 | 50.2 |
| | 380 | 454 | 428 | 340 | 386 | 361 | 275.0 | 319.2 | 274.8 | 251.7 | 291.6 | 250.1 |
| | 63.3 | 75.6 | 71.3 | 56.7 | 64.3 | 60.1 | 45.8 | 53.2 | 45.8 | 52.0 | 48.6 | 41.7 |

| Heats No. | Remaining heats (T) | | | Electric power (KWH/ch) | | | O₂ (Nm³/charge) | | | N₂ (Nm³/charge) | | |
|---|---|---|---|---|---|---|---|---|---|---|---|---|
| | A | B | C | A | B | C | A | B | C | A | B | C |
| 1 | 10.3 | 0 | 10.2 | 15300 | 18300 | 18500 | 2030 | 1780 | 1740 | 66.0 | 49.2 | 0 |
| 2 | 10.1 | 0 | 10.1 | 14900 | 18100 | 14700 | 1380 | 1760 | 1400 | 48.8 | 48.5 | 0 |
| 3 | 9.8 | 0 | 9.7 | 15000 | 18300 | 14800 | 1370 | 1780 | 1400 | 50.4 | 49.5 | 0 |
| 4 | 9.6 | 0 | 10.0 | 14500 | 17800 | 15200 | 1420 | 1740 | 1440 | 48.3 | 48.3 | 0 |
| 5 | 11.4 | 0 | 10.0 | 14600 | 18000 | 15200 | 1395 | 1750 | 1440 | 45.3 | 48.3 | 0 |
| 6 | 0 | 0 | 0 | 14800 | 17400 | 15000 | 1387 | 1690 | 1430 | 48.9 | 46.2 | 0 |
| | 51.2 | 0 | 50.0 | 89100 | 107900 | 93400 | 8982 | 10500 | 8850 | 307.7 | 290.2 | 0 |

TABLE 4

| | Tap-Tap (Min) | On-Tap (Min) | T/Hr | Yield (%) | KWH/T | O₂ Nm³/T | N₂ Nm³/T |
|---|---|---|---|---|---|---|---|
| A | 63.3 | 56.7 | 39.0 | 90.2 | 360 | 36.3 | 1.24 |
| B | 75.6 | 64.3 | 38.0 | 89.9 | 376 | 36.6 | 1.01 |
| C | 71.3 | 60.1 | 34.5 | 89.5 | 380 | 36.0 | 0 |

Note:
Yield = [Billet (T)/Charged scrap (T)] × 100

What is claimed is:

1. A method of operating a steel making electric furnace that uses arc heat of electrodes to melt metal, comprising:
blowing gas through a plurality of holes in which at least one of the holes is in each of a plurality of plugs and then blowing into a molten metal in an amount of 1 to 40N l/min per hole, 20 to 800N l/mm per plug, and at a pressure of less than 10 kg/cm²·g, the plugs being spaced apart from each other within a furnace bed on a bottom of a furnace, the blowing taking place when a period of refining starts in which charged scraps are molten thereby constituting the molten metal to a period in which the molten metal is tapped; and
controlling a swelling height of the molten metal to not more than 1000 mm.

2. The method as claimed in claim 1, wherein the controlling includes controlling the swelling height between 50 and 500 mm.

3. The method as claimed in claim 1, wherein the blowing includes selecting the gas to be blown from the group consisting of an inert gas, oxidizing gas and reducing gas.

4. The method as claimed in claim 1, wherein the blowing includes blowing the gas through a plurality of holes in each of the plugs of not more than 50 per plug, each of the holes being 0.6 to 1.5 mm in diameter.

5. The method as claimed in claim 1, wherein the blowing includes blowing through the holes in which each of the holes is positioned concentrically around an axis of the furnace.

6. The method as claimed in claim 1, wherein the blowing includes blowing through the holes in which each of the holes is positioned nonconcentrically around an axis of the furnace.

7. The method as claimed in claim 1, wherein the blowing includes changing at least one of blowing pressure and amount of the gas per each of the plugs.

8. The method as claimed in claim 1, wherein the blowing is dependent upon bath depth of the molten metal, agitating energy, bath swelling height of the molten metal, and gas blowing amount per plug for each bath temperature of the molten metal.

9. The method as claimed in claim 1, wherein the initially blowing includes selecting the gas to be blown from the group consisting of an inert gas, oxidizing gas and reducing gas.

10. The method as claimed in claim 1, wherein the initially blowing takes place during a melting period so that foreign matter and molten materials do not go into the holes and the molten metal is not cooled.

11. The method as claimed in claim 1, wherein the initially blowing includes blowing through the holes in an amount of more than 1N l/min per hole, more than 20N l/mm per plug, and at a pressure of more than 1 kg/cm²·g, the initially blowing including increasing a blowing amount and pressure in response to an increase in the amount of the molten metal so as to not cool the molten metal.

12. The method as claimed in claim 11 wherein the predetermined portion of the molten metal from the previous charge remaining on the furnace bottom is 10 to 30% of the total molten metal of the previous charge.

13. The method as claimed in claim 1, further comprising:
refining the molten metal and including effecting a slag coating on an area of the furnace bed by adding a slag forming agent to the molten metal.

14. The method as claimed in claim 1, wherein the blowing includes blowing through the furnace that has an inlet and an outlet in which the outlet is higher in elevation than the inlet, the furnace bed being divided into an outlet range and an inlet range by a plane vertically transverse to a plane passing horizontally through a center axis of the outlet so that the outlet range is closer to the outlet than the inlet range, the blowing including blowing through the holes in which more of the holes are positioned in the outlet range than in the inlet range.

15. The method as claimed in claim 14, wherein the blowing includes blowing into the holes in which a distance between a center of each of the holes on the inlet side to the furnace axis is less than a distance between a center of each of the holes on the outlet side to the furnace axis.

16. The method as claimed in claim 1, wherein the blowing is intermittent.

17. The method as claimed in claim 1, wherein the blowing is continuous.

18. The method as claimed in claim 1, wherein the charged scraps are initially of irregular shapes occupying a space within the furnace before they become molten; further comprising:

initially blowing the gas through the holes into the molten metal to splash the molten metal up toward the charged scraps of irregular shapes before the first-mentioned blowing and controlling.

19. The method as claimed in claim 18, wherein the initially blowing is intermittent until the charged scraps become molten.

20. The method as claimed in claim 19, wherein the intially blowing is continuous until the charged scraps become molten.

21. The method as claimed in claim 18, further comprising:

charging scraps with the arc heat of the electrodes during the initially blowing under a condition in which a predetermined portion of the molten metal produced by a previous charge is retained on the bottom of the furnace at an upper limit so that the molten metal does not flow outside of the furnace, the initially blowing taking place from the charging of the scraps and after electrical conduction takes place between the electrodes to a period in which melting of the scraps is finished during which the molten metal swells and thereby splashes up toward the scraps of irregular shapes.

* * * * *